Feb. 7, 1933.    B. DICK ET AL    1,896,223
HYDRAULIC BRAKE MECHANISM
Filed July 11, 1928
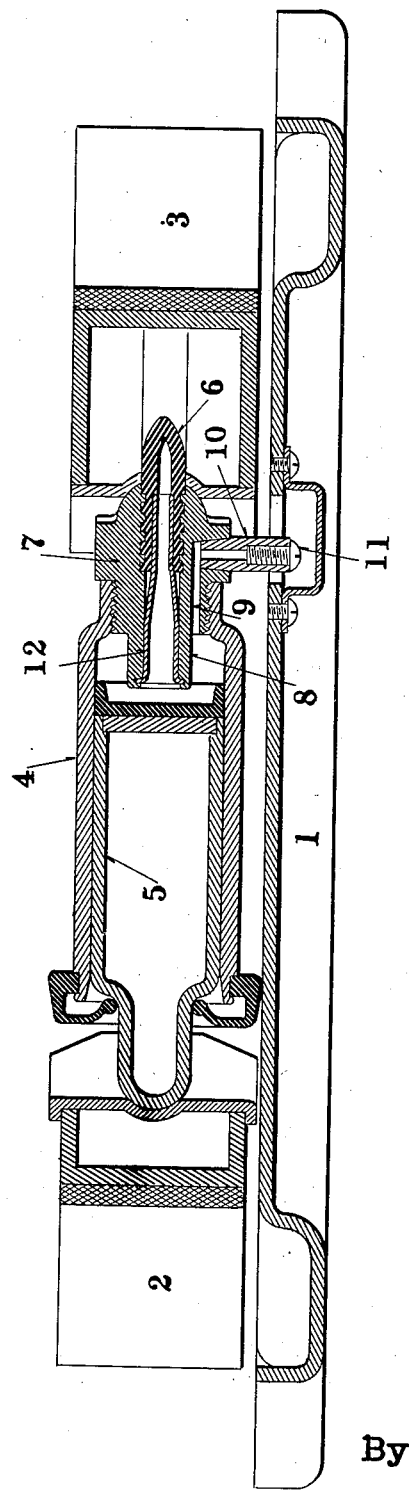
Inventors
Burns Dick
Steve Schnell
By ____ Att'y.

Patented Feb. 7, 1933

1,896,223

UNITED STATES PATENT OFFICE

BURNS DICK AND STEVE SCHNELL, OF ST. LOUIS, MISSOURI, ASSIGNORS TO WAGNER ELECTRIC CORPORATION, OF ST. LOUIS, MISSOURI, A CORPORATION OF DELAWARE

HYDRAULIC BRAKE MECHANISM

Application filed July 11, 1928. Serial No. 291,723. REISSUED

Our invention relates to hydraulic braking apparatus for vehicles and particularly to means for connecting the flexible hose to the piston cylinder combination which actuates the brake shoes, it being the object to form a connector which performs the functions hereinafter described.

The figure of the accompanying drawing is a cross sectional view of our connector and of sufficient of the brake apparatus to illustrate its embodiment and relation to other parts.

1 represents the mounting plate for the shoes 2 and 3, 4 and 5 represent respectively a drawn metal cylinder and drawn metal piston to cooperate therewith by means of which the shoes are actuated. The flexible hose 6 which transmits the braking liquid from the source of pressure, is connected with the cylinder 4 by means of the hose fitting 7. This fitting is provided with a threaded portion engaging with a threaded opening in the end of the cylinder and with a part 8 which extends within the cylinder to form a stop for limiting the inward travel of the piston. As is known, it is necessary in hydraulic braking apparatus to provide means for expelling all air from the liquid containing parts and it has heretofore been the practice to make an opening in the wall of the cylinder for this purpose, this opening being usually referred to as the "bleeder" opening and being closed by a screw. However, it is not convenient to form and provide means for closing such an opening in the thin wall of a drawn metal cylinder and we have conceived the idea of incorporating the bleeder passage in the hose fitting 7, this passage being marked 9 in the drawing. Preferably also we apply to the fitting a laterally extending nipple 10 forming an extension of this passage and provided with a screw plug 11 to close the opening. This nipple extends through the mounting plate 1 and thus becomes accessible for the attachment of the bleeder hose which is used while pumping liquid through the system to eliminate all air therefrom. The hose 6 is permanently attached to the fitting 7 by any suitable known means, such as by the expanded metal part 12 forcing the material of the hose into the annular depressions in the end of the interior wall of the fitting.

Having fully described our invention, what we claim as new and desire to secure by Letters Patent of the United States is:

1. A braking device comprising brake shoes, hydraulic means for actuating said shoes comprising a cylinder and a piston movable therein, a liquid supply conduit, and a fitting permanently attached to said conduit for connecting it with the cylinder, said fitting being provided with a part projecting into the cylinder to form a piston stop.

2. A braking device comprising brake shoes, hydraulic means for actuating said shoes comprising a cylinder and a piston movable therein, a liquid supply conduit, and a fitting on said conduit and provided with a passage connecting the latter with the cylinder, said fitting being provided with a part projecting into the cylinder to form a piston stop and with a second passage communicating with the cylinder and extending to the exterior of the fitting.

In testimony whereof, we hereunto affix our signatures, this 9th day of July, 1928.

BURNS DICK.
STEVE SCHNELL.